(12) United States Patent
Jörg et al.

(10) Patent No.: US 12,027,812 B2
(45) Date of Patent: Jul. 2, 2024

(54) LASER SYSTEM PROVIDING A SHAPED INTENSITY PROFILE OF AN OUTPUT BEAM WITHIN AN UNSTABLE OPTICAL RESONATOR LAYOUT AND METHOD THEREOF

(71) Applicant: FYZIKALNI USTAV AV CR, V.V.I, Prague (CZ)

(72) Inventors: Körner Jörg, Dolni Brezany (CZ); Antonio Lucianetti, Dolni Brezany (CZ); Tomas Mocek, Dolni Brezany (CZ); Joachim Hein, Magdala (DE)

( * ) Notice: Subject to any disclaimer, the term of this patent is extended or adjusted under 35 U.S.C. 154(b) by 0 days.

(21) Appl. No.: 17/098,394

(22) Filed: Nov. 15, 2020

(65) Prior Publication Data

US 2021/0167567 A1    Jun. 3, 2021

Related U.S. Application Data

(63) Continuation of application No. PCT/CZ2019/050020, filed on May 17, 2019.

(30) Foreign Application Priority Data

May 17, 2018    (CZ) ................................ CZ2018-228

(51) Int. Cl.
*H01S 3/08*    (2023.01)
*H01S 3/0804*    (2023.01)
(Continued)

(52) U.S. Cl.
CPC ........ *H01S 3/08081* (2013.01); *H01S 3/0804* (2013.01); *H01S 3/09415* (2013.01);
(Continued)

(58) Field of Classification Search
CPC ........... H01S 3/09415; H01S 3/094038; H01S 3/115; H01S 3/1022; H01S 3/1103;
(Continued)

(56) References Cited

U.S. PATENT DOCUMENTS 4,458,350 A * 7/1984 Holl ........................ H01S 3/106 372/99
5,022,043 A * 6/1991 Jacobs ................ H01S 3/08081 372/71

(Continued)

OTHER PUBLICATIONS

Daijun Li et al: "Diode-end-pumped double Nd:YLF slab laser with high energy, short pulse width, and diffraction-limited quality", Optics Letters, Optical Society of America, US, vol. 33, No. 15, Aug. 1, 2008 (Aug. 1, 2008), pp. 1708-1710, XPOO1515688,ISSN: 0146-9592, DOI: 10.1364/0L.33.001708 p. 1708, right-hand column—p. 1709, right-hand column; figures 1, 3.

(Continued)

*Primary Examiner* — Michael Carter
(74) *Attorney, Agent, or Firm* — Tatonetti IP

(57) ABSTRACT

The present invention relates to a laser system and a method of generating a defined spatial mode-shaped laser beam using an unstable laser resonator layout. The laser system for mode shaping of a laser beam within an unstable optical resonator layout comprising an active medium, characterized in that, the active media comprises a pumped area, wherein the gain distribution is generated by an optical pump beam's spatially intensity profile.

In a preferred embodiment, the system may further comprise an end-pumped layout to deliver the spatially shaped optical pump beam to the active medium; and/or an active element and/or a passive element for modifying the resonator losses; and/or means of output coupling of a laser beam from said unstable resonator layout.

(Continued)

The system according to the present invention is suitable to deliver a top-hat beam profile.

11 Claims, 3 Drawing Sheets

(51) Int. Cl.
| | |
|---|---|
| *H01S 3/0941* | (2006.01) |
| *H01S 3/102* | (2006.01) |
| *H01S 3/11* | (2023.01) |
| *H01S 3/121* | (2006.01) |
| *H01S 3/094* | (2006.01) |
| *H01S 3/115* | (2006.01) |

(52) U.S. Cl.
CPC .......... *H01S 3/1022* (2013.01); *H01S 3/1103* (2013.01); *H01S 3/121* (2013.01); *H01S 3/094038* (2013.01); *H01S 3/115* (2013.01); *H01S 2301/206* (2013.01)

(58) Field of Classification Search
CPC .... H01S 3/121; H01S 3/08081; H01S 3/0804; H01S 2301/206
See application file for complete search history.

(56) References Cited

U.S. PATENT DOCUMENTS

| | | |
|---|---|---|
| 5,115,445 A | 5/1992 | Mooradian |
| 2006/0114951 A1* | 6/2006 | Chou .................... H01S 3/0627 372/36 |
| 2015/0295380 A1 | 10/2015 | Russbueldt et al. |

OTHER PUBLICATIONS

Siegrist M. R. et al: "Mode Structure in the Unstable Resonator of an Optically Pumped Fir Laser: An Investigation", Applied Optics, Optical Society of America, Washington, DC; US, vol. 19, No. 22, Nov. 15, 1980 (Nov. 15, 1980), pp. 3824-3829, XP000709203, ISSN: 0003-6935, DOI: 10.1364/AO.19.003824 p. 3827; figure 6.

* cited by examiner

[Fig. 1].
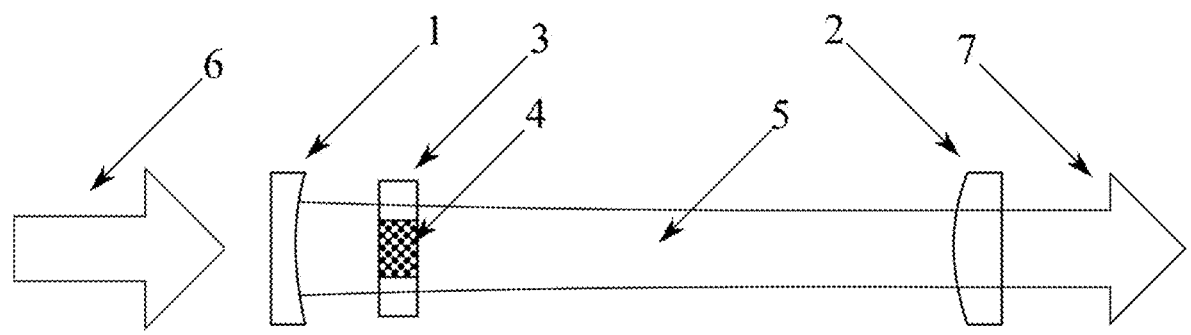
[Fig. 2].
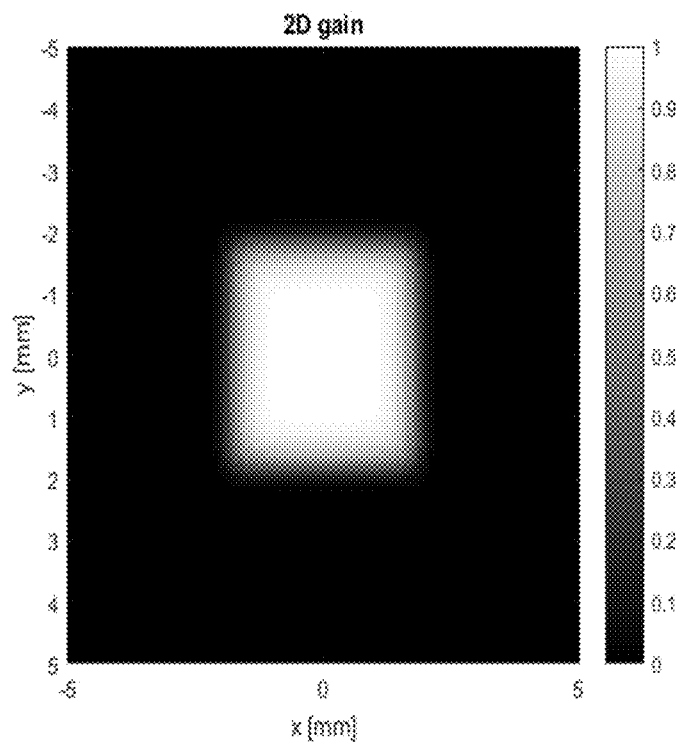

[Fig. 3].
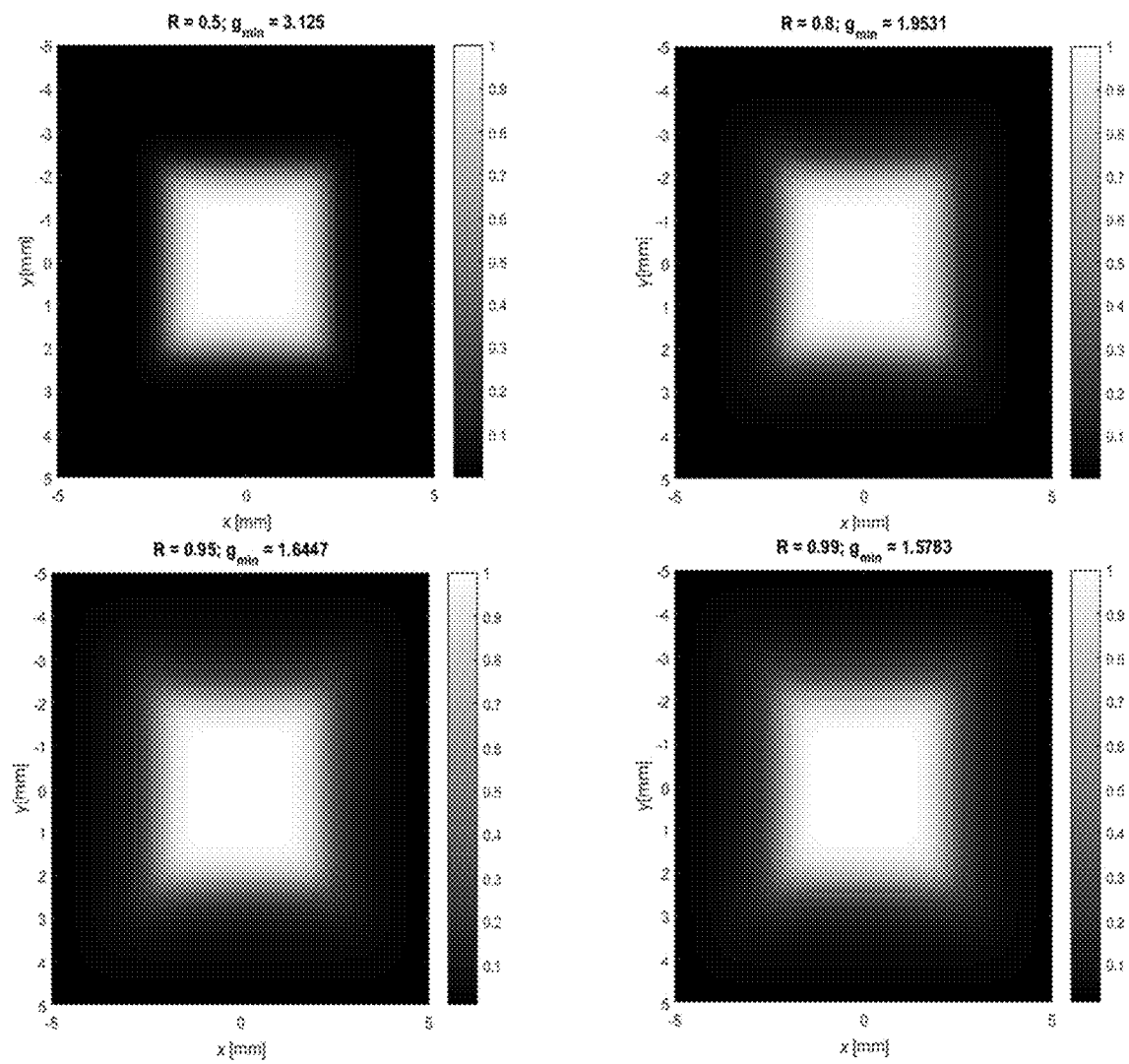

[Fig. 4].
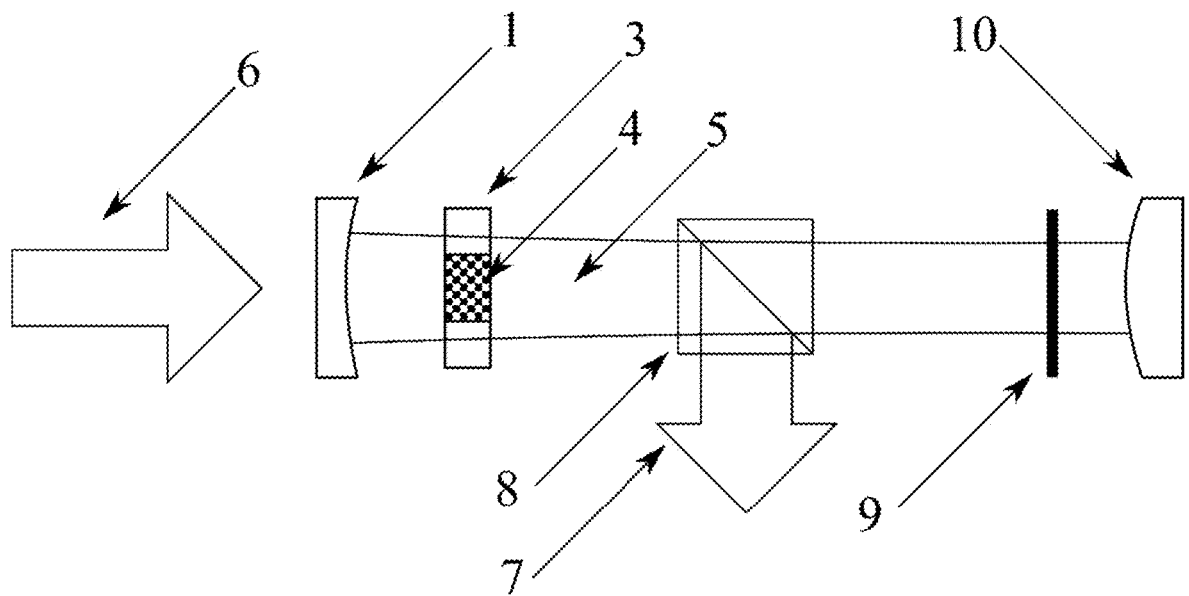
[Fig. 5].
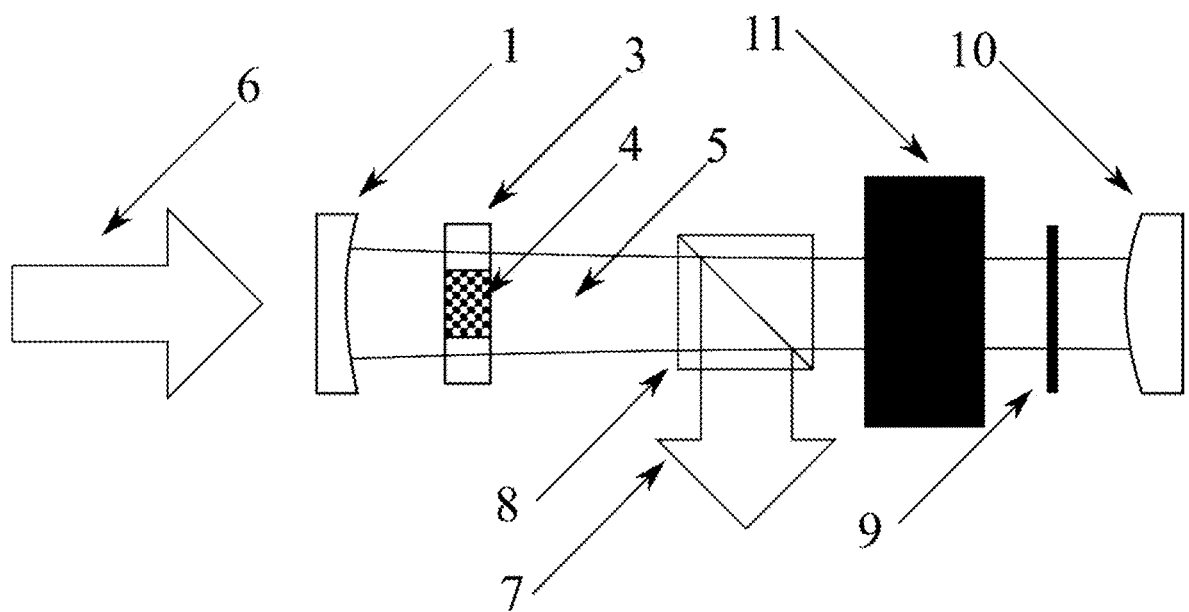

LASER SYSTEM PROVIDING A SHAPED INTENSITY PROFILE OF AN OUTPUT BEAM WITHIN AN UNSTABLE OPTICAL RESONATOR LAYOUT AND METHOD THEREOF

This application is the continuation of International Application No. PCT/CZ2019/050020, filed 17 May 2019, which claims the benefit of Czech patent application PV 2018-228, filed 17 May 2018, the entire contents of which are hereby incorporated by reference.

TECHNICAL FIELD

The present invention relates to a laser system and a method for generating a defined spatially shaped laser beam using an unstable laser resonator. In particular, the present invention relates to the laser system and method capable of producing a top-hat shaped intensity distribution of the output beam. More particularly, the usage of the present invention relates to a q-switch operation and/or cavity dump mode and/or as a regenerative amplifier and/or system for mode locking regime.

BACKGROUND ART

The generation of nanosecond pulses within a laser system requires scaling the beam size according to the output energy to avoid laser-induced damage (LID) on any optics within the system due to too high fluence on some optical element. For instance, typical maximum save fluence values for a pulse-width of 10 ns at a wavelength close to 1 μm are in the range from 3 to 10 J/cm$^2$. Hence, achieving energies within the range of 1 J, or more, requires beam diameters exceeding 5 mm. However, it should be mentioned that, for the skilled person in the art, the values of LID are known.

Laser, in its simplest form, consists of an active medium, where spontaneous emission occurs, and a set of mirrors reflecting the light back into the active medium, which leads to amplification by stimulated emission.

To generate a laser beam the mirrors have to be arranged around the active medium in such a way that the losses for light emitted by the laser crystal in between two amplifying passes, are smaller than the gain achieved while passing the active medium. Such a layout is known as a laser resonator. The laser resonator may be stable or unstable.

While the stable resonator generates the same intensity distribution for a given spatial intra resonator mode after every round-trip, in an unstable resonator, the spatial intensity distribution will be changed in each round-trip. This will lead to an at least partly ejection of the generated beam from the cavity after several round-trips.

In the stable laser resonator the generated output beam profile typically exhibits a Gaussian intensity distribution corresponding to the TEM00 mode. Such beam profile can be seen as ideal e.g. in point of focusing capability. Nevertheless, such beam, due to its very low edge steepness, needs relatively large aperture optics as well for beam transport as with respect to the excited area in the corresponding active medium.

In comparison, constant intensity level with relatively sharp edges, so called top-hat profile, allows to significantly reduce such aperture while maintaining the same maximum intensity level, typically given by the optics LID threshold. Furthermore, the efficiency of a laser system is strongly linked with the extracting intensity (or in point of pulsed lasers extraction fluency), where higher intensity corresponds to higher extraction efficiency (W. Koechner, "Solid State Laser Engineering", Springer Science and Business Media, 1999). Hence, the LID limited maximum efficiency in case of a TEM00 beam can only be achieved in the centre of the beam, while with a top-hat beam this can be achieved in the full beam area. Hence, the generation of a top-hat like intensity distribution within a laser is highly desirable.

State of the art unstable resonator layouts allow for a laser resonator generating a uniform intra-cavity intensity distribution. The basic layout of such resonators consists of two mirrors, establishing a magnification for the intra-resonator beam with each round-trip. Hence, the resulting intra cavity intensity distribution completely fills the aperture of the active medium. The challenge in such systems arises from the fact that the beam diameter would grow until it reaches the aperture of the systems optics. Hence, a method to limit the beam size has to be implemented in such layout. As absorbing apertures would lead to a waste of laser energy the beam size in unstable resonators is mostly controlled by ejecting the outer part (geometrical approach) of the intra resonator beam from the resonator (so called output coupling).

In many previous layouts, the spatially dependent output coupling was achieved with hard apertures on one of the resonators optical elements like overfilling the aperture of one of the cavity mirrors or dedicated scraping mirrors. By this the resonator mode size is effectively limited and thus efficiently avoids clipping at the aperture of the active medium. Details on such systems can be found in the non-patent literature (W. Koechner, "Solid State Laser Engineering", Springer Science and Business Media, 1999). The disadvantage of such scheme is that the output beam does not resemble the cavity mode as part of it is masked e.g. by one of the cavity mirrors. Hence, the shape of the output intensity profile often has an undesirable geometrical shape, e.g. torus. Additionally, as the masking will introduce very steep edges in the beam profile, significant diffraction effects distort the propagating output beam. Furthermore, in order to avoid clipping at the aperture of the active medium, the intra resonator intensity cannot fill its aperture completely as some margin has to be included, thus limiting extraction efficiency.

To avoid such masking, it was proposed (U.S. Pat. No. 4,096,447A) to include a partial reflective mirror as one of the end mirror. This approach eliminates the masking, but the cavity mode needs to be limited in size by an internal aperture e.g. the one of the laser medium. According to the magnification of the cavity mode, this aperture absorbs any amount of energy in the cavity that is not coupled out and by means of the cavity's internal magnification overshoots its diameter. Similar approaches were reported before using a polarizer and a wave plate placed within the cavity and thus generating some output coupling in every roundtrip. Even though these setups solve the problem of the masking and also to some extend the filling of the laser crystal's aperture, the efficiency is still limited as part of the energy stored in the cavity is not coupled out of the system but absorbed by an aperture. Also, as the aperture features steep edges, diffraction effects again could distort the beam profile.

Hence, huge efforts were placed in finding a way to efficiently limit the beam size in the unstable cavity without generating sharp edges, masking or losses that do not contribute to the output energy.

In EP0231050B1, a mirror with a radially varying reflectivity profile, also called Gaussian reflectivity mirror (hereinafter GRM), is used, which addresses most of these issues. It allows generate a defined output intensity distribution with a super Gaussian profile, which especially for higher orders is close to a real top-hat profile. This technique found application in many industrial high energy lasers. However, as it will be shown in the following, it still has drawbacks that as well limit the extraction efficiency and prohibits usage in combination with low gain a media such as Ytterbium doped gain media, which attracted a lot of interest in the last two decades due to very good compatibility with laser diode pumping and high intrinsic efficiency.

A detailed theoretical derivation on how to layout a system based on a GRM and how to calculate the output beam profile can be found in the non-patent literature. A comprehensive article summarizing previous works is M. Morin, "Graded reflectivity mirror unstable laser resonators" in Journal of Optical and Quantum Electronics 29 (1997), pages 819-866. According to this article, a top-hat or super Gaussian beam distribution without a low intensity region in the middle can only be achieved in such a layout, when the maximum reflectivity $\rho_{GRM}$ (according to the amplitude of the electrical field) in the center of the GRM fulfils this condition:

$$\rho_{GRM}^2 \leq \frac{1}{|M|^{PW}}$$

Here M is the geometrical roundtrip magnification of the cavity and PW the desired super Gaussian order of the output profile. Furthermore, the cavities feedback $\gamma$ (again in terms of electrical field amplitude) is given by:

$$|\gamma|^2 = \frac{\rho_{GRM}^2}{M^2}$$

These two design rules imply that an according laser layout has to exhibit a high gain to compensate for low feedback or the super Gaussian order of the output beam is strongly limited, or alternatively the cavity is limited to low magnification increasing the alignment sensitivity. This so far limited the usage of such cavities to neodymium doped materials and other high gain media.

Another disadvantage of this approach is that the pumped area of the laser cannot be used completely, as the complete cavity mode has to be fitted into the active medium, limiting the extraction efficiency in the outer areas of the beam profile. Furthermore, as the output coupling is realized by means of the GRM, releasing a spatially tailored fraction of the intra-cavity intensity in every roundtrip, such lasers cannot be operated in a cavity dump mode, which would allow for shorter pulse lengths, or be used as a regenerative amplifier. U.S. Pat. No. 5,022,043 discloses an unstable laser resonator with for efficient coupling a high energy beam. An embodiment is shown in FIG. 1. However, the drawback of this embodiment is the missing means or step for coupling out high power beam depending on the polarization.

SUMMARY OF INVENTION

It is an object of the present invention to overcome the above mentioned drawbacks, by presenting a system and method for the mode shaping of a laser beam within an unstable optical resonator layout without introducing apertures, which mitigates diffraction effects and additional round-trip losses induced thereof. The output beam profile generated from the layout, according to the present invention, will resemble the homogeneous intra resonator intensity distribution and therefore a top-hat beam profile.

In another aspect of advantage of the present invention, it also allows the use of low gain media like ytterbium doped materials and therefore the invention allows utilize a wider range of laser materials together with the unstable laser resonator layout and therefore to access as well new wavelength as higher laser efficiencies.

Furthermore, the invention allows to generate top hat shaped beam profiles without the need of the GRM, which in general can be regarded as complicated to manufacture and to align.

According to one aspect of the present invention, it is provided a laser system for mode shaping of a laser beam within an unstable optical resonator layout comprising an active medium, wherein the active medium comprises a pumped area wherein the gain distribution is generated by an optical pump beam's spatial intensity profile.

The intensity profile of the optical pump beam within the active medium is realized within a so called end pumped design, meaning that the optical pump beam is co-propagating through the active medium in parallel with the intra resonator beam in the unstable optical resonator.

The spatial shape of the output intensity profile of the laser layout can be of any geometrical shape, preferably round, elliptical, rectangular, quadratic or hexagonal shape. According to this embodiment, the invention provides approximately top-hat intensity distribution within an arbitrary geometrical shape.

The present invention overcomes the state-of-the-art in that the expanding mode within the resonator is only amplified in a defined part of the active medium, where the spatially shaped optical pump beam generates inversion and thus gain.

The source of the optical pump beam may be any suitable laser source, preferably a diode pump engine, light emitting diodes, lamps or another laser source.

In a preferred embodiment, the optical pump beam is characterized by a top-hat intensity distribution. The steepness of the edges of the intensity distribution may vary according to the desired edge steepness of the generated output beams intensity profile.

Due to the spatially defined gain distribution within the active medium, the parts of the intra resonator beam, which are outside of the gain region generated by the pump beam, will no more be amplified. Due to resonator losses (for example originating from loss mechanisms and output coupling) and the magnification in every round-trip, the intensity of this part of the intra resonator beam will be constantly reduced, and thus the beam diameter will be limited. As no apertures are needed, no additional losses are introduced in the cavity and no clipping on sharp edges will occur. Further, as the intra resonator beam is bigger than the optical pump beam, the total pump area is used for extraction, thus allowing for high extraction efficiency of the laser.

In a preferred embodiment, the system further comprises an end-pumped layout to deliver the spatially shaped optical pump beam to the active medium.

In an embodiment, the active medium is made of a low gain material, preferably a solid state medium, more preferably a material doped with a rare earth element such as neodymium, erbium, ytterbium or thulium doped gain media.

Such media are well known to exhibit long fluorescence lifetimes that are ideal for diode pumping and relatively large amplification bandwidth, which makes them suitable for the use in ultra-short pulse lasers as well as in tunable laser sources. The usage of such media within a GRM-based resonator concept was so far strongly limited, as in this concept, a minimum gain in dependence of the output beams intensity distribution's edge steepness is required. This drawback is widely eliminated within a system according to the invention, where almost only the reduction of the intra resonator intensity due to the resonators magnification is compensated, while the losses due to output coupling can be small.

In another preferred embodiment, the system further comprises an active element and/or a passive element for modifying the resonator losses in time.

Active elements are means of electronically controlled modulators which can be realized, in certain embodiments by: acousto-optical modulators; electro optical modulators (e.g. Pockels cell in combination with polarizing optics); mechanical modulators (e.g. shutter, rotating mirror).

Passive elements are modulating the resonator losses based on the intra resonator intensity. Such are realized e.g. by: saturable absorbers (e.g. as bulk absorber or mirror); non linear effects (e.g. Kerr effect generating an additional lens at high intensities).

In some embodiments, the system comprises a means of output coupling, which may be realized by a partially reflecting mirror, or; a beam splitter, or a polarizer and polarization rotating element.

In the preferred embodiment, the separation of the intra cavity laser beam and the optical pump beam can be achieved by a dichroic mirror.

According to another aspect of the invention, the above mentioned system can be used, i.e. operated in q-switch or cavity dump mode or as a regenerative amplifier or in a mode locking regime.

According to another aspect of the invention, it is provided a method of mode shaping of a laser beam within an unstable optical resonator layout comprising an active medium, wherein the method comprises the step of delivering an optical pump beam into an area in the active medium, wherein the gain distribution is generated by an optical pump beam's spatial intensity profile.

In some embodiment, a resonator loses are modifying by using at least one active element and/or at least one passive element. Such methods allow to generate short pulses from the laser utilizing either of these techniques or to use such resonator as regenerative amplifier.

In some embodiment, the laser beam is coupled out by means selected from the group consisting of: a partially reflecting mirror; a beam splitter; a polarizer and polarization rotating element.

In some embodiment, the optical pump beam is coupled into the resonator layout by a dichroic mirror.

BRIEF DESCRIPTION OF DRAWINGS

FIG. 1 represents the basic resonator layout carried out according to the state of the art.

FIG. 2 represents normalized gain distribution achieved by the system disclosed in the preferred embodiment.

FIG. 3 represents output beam profiles for different output coupler reflectivity.

FIG. 4 represents resonator layout with variable output coupling.

FIG. 5 represents resonator layout for q-switch or cavity dump operation.

DESCRIPTION OF EMBODIMENTS

The following detailed description of the embodiments is provided as a brief overview of the claimed system. It shall not limit the invention in any aspect, with a detailed and fully-enabling disclosure being set in this section. Likewise, the invention shall not be restricted to any numerical parameters, processing equipment, operational conditions, and other variables unless otherwise stated herein.

According to a preferred embodiment, the laser system is based on an unstable resonator layout. The unstable resonator layout can be a positive branch cavity layout such as shown in [FIG. 1].

Said layout comprises two spherical mirrors, in particular a concave mirror 1, reflective for laser and antireflective for pump radiation; and a convex output coupling mirror 2; and an active medium 3. The gain distribution in the active medium 3 is generated by an optical pump beam 6, preferably shaped. The optical pump beam 6 may be preferably provided by another laser system or by a diode laser source, wherein the layout includes means of beam shaping.

In the following, the shape of optical pump beam 6 can be approximated by a quadratic top-hat shape.

The active media 3 comprises a pumped area 4 in the active medium 3, into which the optical pump beam 6 is directed. From the area 4 an intra resonator beam 5 is generated so that, the profile resembles the gain distribution generated by the optical pump beam 6.

As shown in FIG. 1, an input coupling of the optical pump beam 6 into the laser resonator is realized by the concave dichroic mirror 1.

The output-coupling can be provided by the partially reflective convex output coupling mirror 2. The transmitted part of the intra resonator beam 5 represents the laser output beam 7.

According to said layout, the distance L between the concave mirror 1 with radius $R_1$ and the partially reflective convex output coupling mirror 2 with radius $R_2$ is given by $$2L = R_1 + R_2$$

The roundtrip magnification is calculated using $$M = \left| \frac{R_1}{R_2} \right|$$

The 2-dimensional mode field within the laser cavity is approximately calculated via $$V(x, y) = V(0, 0) \prod_{k=1}^{\infty} \frac{\rho\left(\frac{x}{M^k}, \frac{y}{M^k}\right)}{\rho(0, 0)},$$

where V(x,y) is the electrical field strength of the cavity mode according to the x and y coordinates orthogonal to the optical axis. In prior art ρ(x,y) is always considered a value smaller than 1, representing the spatially dependent cavity losses (concerning field strength), e.g. the reflectivity profile of a GRM. The shaping method relies on the spatial modulation of the resonator losses, hereinafter referred to as a loss modulation. ρ(x,y) has a value bigger than 1, due to the gain modulation, hereinafter referred to as a win modulation.

FIG. 1 represents an example, where following parameters were applied: $R_1$=5000 mm, $R_2$=−4000 mm, M=1.25.

FIG. 2 represents the normalized gain distribution, whereas the gain distribution is a rectangular super-Gaussian distribution of order 8 with a width of 4 mm. The above mentioned normalized gain distribution was calculated for a model-system according to the one described above and shown in [FIG. 1].

FIG. 3 shows an embodiment according to the present invention, wherein the normalized output shaped laser beam 7 mode profiles for different amplitude reflectivity of the partially reflective convex output coupling mirror 2. The according reflectivity R (in terms of intensity) of the partially reflective convex output coupling mirror 2 and the minimum round-trip gain g that is necessary to compensate for the resonator losses generated by magnification and output coupling is given above the individual graphs.

As it can be demonstrated, that due to the win modulation of the resonator mode there is no hole generated in the middle of the shaped laser beam 7, even for very low output coupling, which allows achieve high feedback for support of low gain materials. The only visible effect for low output coupling is that the wings of the shaped laser beam 7 profile smear out. This is normally acceptable in a laser setup when the optics' size is dimensioned accordingly. Additionally, as the intensity plateau of the extracting mode is always bigger or equal compared to the pumped area 4, the extraction efficiency is always homogeneously distributed over the full pumped area 4 and therefore not geometrically limited.

Furthermore, the optical pump beam profile 6 and the produced output beam profile 7 are both quadratic. In fact, the output laser beam 7 intensity profile will resemble the intra resonator beam profile 5, which is similar to the gain distribution following the optical pump beams intensity profile 6.

In another embodiment, in the system as described above and with accordance to FIGS. 4 and 5, the convex output coupling mirror 2 was replaced by a convex mirror 10, which is high reflective. The output coupling is realized using a variable polarization output coupling, preferably selected form the group as mentioned in the description, preferably mentioned here a polarizer 8 and a quarter wave plate 9, which allows adjusting the output coupling to optimize a given system, such as shown in [FIG. 4].

By additionally introducing a Pockels cell 11 into the resonator, shown on [FIG. 5], the layout can be used for q-switching operation as well. In contrast to GRM based systems, the output beam 7 will be emitted from the polarizer 8. In case of the Pockels cell 11 this is advantageous, as for q-switched operation mode the Pockels cell 11 can be operated at less than the quarter wave voltage. Again, by adjusting the Pockels cell 11 voltage, the output coupling per roundtrip in the switched state can be adjusted, which allows to optimize output pulse shape and energy.

Furthermore, the same scheme as shown in [FIG. 4] also allows for cavity dump operation if the Pockels cell 11 is switched for quarter wave operation. Though the beam profile will have long edges in this case (output coupling embodiment in [FIG. 3]) this is still acceptable in most cases. In this operation mode, the pulse duration will be in the range of the round-trip time of the resonator, which is shorter than in q-switch mode. The actual steepness of the edges in this operation mode will be linked with the available gain in the laser system and the losses that are present in the resonator especially outside the amplifying area 4 (e.g. re-absorption).

As cavity dumping is operable in this resonator scheme, direct seeding and the use as regenerative amplifier is also possible by injecting a seed pulse into the resonator counter propagating the output in the cavity dump operation mode. In principle, also the combination with sub round-trip loss modulation or mode locking techniques is possible.

INDUSTRIAL APPLICABILITY

The present invention may be industrially applied in the field of optics, in particular in the field of laser technology dedicated to shape modulation thereof.

More particular, the invention may be used to realize high power and/or high energy class laser systems with a wide range of parameters regarding pulsed/CW operation, pulse parameters and wavelength. Such lasers again are applicable in a wide range of scientific, medical and industrial applications like pump lasers for other laser systems, laser sintering, laser shock peening, Imaging diagnostics, surgery etc.

REFERENCE SIGNS LIST 1 concave mirror, reflective for laser and antireflective for pump radiation
2 partially reflective convex output coupling mirror
3 active medium
4 pumped area in active medium
5 intra resonator beam
6 optical pump beam
7 shaped laser beam
8 polarizer
9 quarter wave plate
10 convex mirror
11 Pockels cell

The invention claimed is:

1. A laser system providing a top-hat profile of an output beam within an unstable optical resonator layout comprising:
   a dichroic mirror for coupling an optical pump beam into the unstable optical resonator;
   an active medium comprising a pumped area, wherein gain distribution of the pumped area is spatially distributed within the active medium, and wherein
   an intra resonator beam is WIN modulated due to gain modulation, and wherein the laser system further comprises
   a reflective convex mirror; and
   a variable polarization output coupling configured to eject the output beam without introducing an aperture, and wherein the output coupling is within the unstable resonator layout.

2. The laser system according to claim 1 further comprising an end-pumped layout to deliver a spatially shaped optical pump beam to the active medium.

3. The laser system according to claim 1, wherein the active medium is made of a low gain material.

4. The laser system according to claim 1, wherein the system further comprises at least one active element and/or at least one passive element for modifying the resonator losses.

5. The laser system according to claim 1, wherein the output coupling is selected from the group consisting of: a polarizer and a polarization rotating element.

6. The system according to claim 1 for use in q-switch or cavity dump operation mode or as a regenerative amplifier or in a mode locking regime.

7. The system according to claim 1 further comprising Pockels cell within the unstable resonator for Q-switching operation.

8. The system according to claim 7, wherein the Pockels cell is switched for quarter wave operation directing a part of the intra-resonator beam into a cavity dump and a part of the intra-resonator beam is ejected as the top-hat beam.

9. A method for delivering a top-hat laser beam from an unstable optical resonator comprising steps of
   delivering a spatially shaped optical pump beam to an active medium; and input coupling the spatially shaped optical pump beam to the unstable optical resonator by a dichroic mirror; and WIN modulating of the spatially shaped optical pump beam and intra-resonator beam in the active medium comprising a pumped area, wherein gain distribution of the pumped area is spatially distributed within the active medium;

output coupling the intra-resonator beam by a variable polarization output coupling within the unstable resonator without introducing an aperture.

10. The method according to claim 9, wherein the resonator losses are modified by using at least one active element and/or at least one passive element.

11. The method according to claim 9, wherein the laser beam is coupled by a means selected from the group consisting of: a polarizer and polarization rotating element.

* * * * *